March 4, 1952  A. L. GRISÉ  2,587,839
AUTOMATIC SHUTOFF VALVE AND SIGNAL FOR HOSE NOZZLES
Filed Dec. 27, 1950
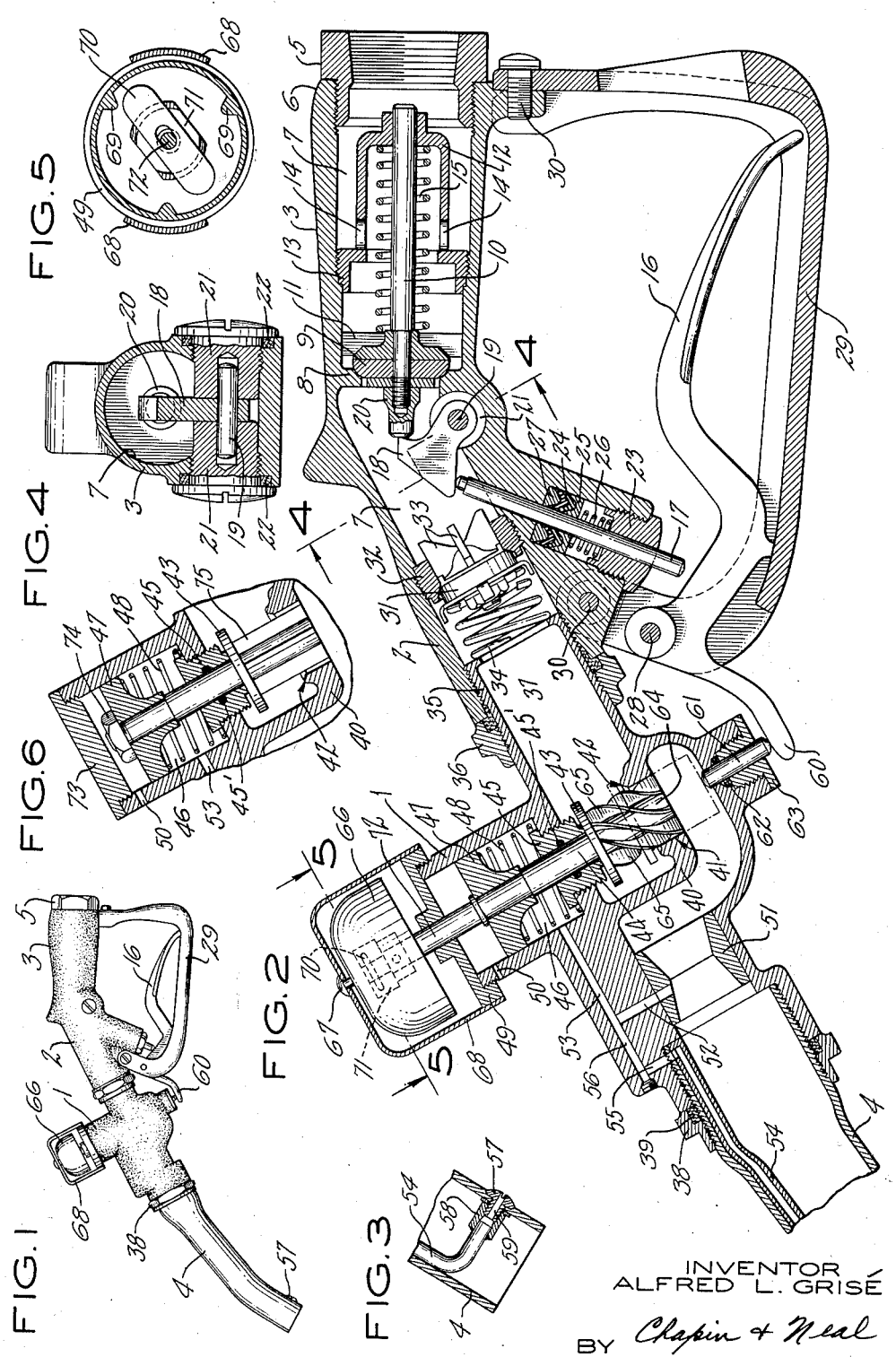
INVENTOR
ALFRED L. GRISÉ
BY Chapin & Neal
ATTORNEYS Patented Mar. 4, 1952

2,587,839

UNITED STATES PATENT OFFICE 2,587,839

AUTOMATIC SHUTOFF VALVE AND SIGNAL FOR HOSE NOZZLES

Alfred L. Grisé, Springfield, Mass., assignor to Gilbert & Barker Manufacturing Company, West Springfield, Mass., a corporation of Massachusetts Application December 27, 1950, Serial No. 202,960

4 Claims. (Cl. 226—66)

1

This invention relates to a safety device for use in the filling of containers to automatically shut off the flow and, optionally, to also indicate by a suitable signal, when the container has been filled to a sufficient extent.

The invention, while capable of general application, finds one advantageous use in connection with hose nozzles, such as are used at gasoline service stations for filling the tanks of automotive vehicles. These nozzles usually have a control valve, which closes automatically by means of a spring when a hand lever, used to open the valve is released. Such nozzles have the disadvantage that the hand lever may be wedged, latched or otherwise held in open position during a tank-filling operation and it therefore is important to provide means for automatically and completely stopping the flow in time to prevent the tank from overflowing in case the operator fails to close the manual valve in time. And it is useful also to provide the signalling means to call the attention of the operator to the fact that the filling operation has been completed.

The invention has for one object the provision in a filling nozzle of the class described of an auxiliary valve, which is initially held open by a spring, is automatically closed by means controlled by the rise of liquid at the outlet end of the spout of the nozzle and is thereafter held closed by pressure of the liquid in the nozzle, together with a lever for cracking the auxiliary valve from its seat, when and only when the hand lever is released to close the main valve, whereby to relieve the liquid pressure on the auxiliary valve and allow the same to be opened by its spring.

The invention has for another object the provision in a filling nozzle of a turbine rotor interposed in the path of flow of liquid through the nozzle, a signal on the nozzle having actuating means driven from the rotor, a valve controlling the flow to the rotor, and means controlled by the rise of liquid at the outlet end of the spout of the nozzle to close the valve and stop the rotation of the rotor and the signal-actuating means driven thereby.

These and other objects will best be understood from illustrative examples of the invention in the accompanying drawings, in which Fig. 1 is a small-scale exterior elevational view of a hose nozzle embodying the invention;

Fig. 2 is a sectional elevational view, drawn to a larger scale, showing the main and auxiliary valves, their controls, the signal and its actuating means, the outlet spout of the nozzle being for the most part broken away;

Fig. 3 is a fragmentary sectional view of the discharge end of the outlet spout, showing the connection of the vent tube thereto;

2

Fig. 4 is a cross sectional view taken on the line 4—4 of Fig. 2;

Fig. 5 is a sectional plan view taken on the line 5—5 of Fig. 2 and showing the audible signal device; and Fig. 6 is a fragmentary sectional view, taken similarly to Fig. 2 and showing a modification in which the signal device is omitted.

Referring to these drawings and first to Fig. 1 thereof, the auxiliary or safety valve and the signalling device are carried by a casing 1, which is adapted to be interposed between the outlet end 2 of the body 3 of a hose nozzle, containing the usual manually-operated valve, and the outlet spout 4 of the nozzle. This nozzle has a bushing 5 at its inlet end 6, adapted for attachment to the free end of the hose of a gasoline dispensing apparatus. Nozzles of this type usually have an outlet tube or spout fastened directly to the outlet end 2 of body 3. To adapt such nozzles for the devices of this invention, the usual spout is removed from the nozzle body and the casing 1 is applied in its place, a new spout, such as 4, having special provisions needed for this invention, being provided on the casing 1. The described arrangement enables existing hose nozzles to be converted into nozzles having the safety features of this invention by removing the old spout and substituting therefor the casing 1 and spout 4 of this invention.

The hose nozzle proper, the parts within and on the body 3, may be of any suitable construction, having a spring-closed valve which can be opened by a hand lever. In the one illustrative example shown herein, the body 3 (Fig. 2) has a conduit 7 therethrough, which extends from the inlet end 6 to the outlet end 2 and which has intermediate such ends a partition 8, having an opening therethrough surrounded by a seat, with which a valve 9 is engageable. Valve 9 is fixed to one end of a stem 10 and has a plurality of angularly-spaced vanes 11, the outer edges of which slidably engage the peripheral wall of a straight cylindrical portion of the passage 7 and guide the valve for straight-line sliding movement in a direction toward and away from its seat. The rear end of stem 10 is slidably mounted in the end wall or head of a cylinder 12, fixed to a bushing 13, threaded into the wall of conduit 7. There are openings, such as 14, in the peripheral wall of cylinder 12 to allow liquid, entering the extreme right hand end of conduit 7, to flow into the cylinder and out through the central opening in bushing 13, to the valve. A spring 15 acts between the head of cylinder 12 and valve 9 to hold the latter to its seat and stop the flow of liquid through conduit 7.

Valve 9 is adapted to be opened against the force of spring 15 by means of a hand lever 16, acting through the intermediary of a cylindrical stem 17, which is mounted to slide in body 3 at an obtuse angle to the axis of stem 10 and has its inner end located in conduit 7 on the outlet side of partition 8. Such inner end engages one side of a rock arm 18, mounted on a fulcrum pin 19, and the other side of the rock arm engages an abutment consisting of a nut 20, which holds the valve 9 on its stem 10. As shown in Fig. 4, the rock arm 18 is mounted between the inner end faces of two studs 21 which are threaded into the body 3 from opposite sides and sealed by packing 22. The fulcrum pin 19 has its ends positioned one in each of two holes formed in and coaxially of studs 21. The stem 17 slides through a suitable stuffing box, which is mounted in a recess in body 3, closed by a bushing 23, and which comprises packing 24 and a gland 25 pressed by a spring 26 to compress the packing against a member 27 in the inner end of the recess. The outer end of stem 17 is located in the path of movement of the hand lever 16. The latter has fixed therein a pin 28, the ends of which are mounted as trunnions, one in each of two side walls of a guard 29 of channel-shaped cross section. The guard 29 extends outwardly from the inlet end 6 of the body at right angles thereto for a short distance and then turns at right angles and extends along the body to the outlet end 2 thereof. The guard is secured at its ends by studs 30 to the body 3.

A check valve, such as 31 is usually provided in the conduit 7. Valve 31 cooperates with a suitable seat on a bushing 32, threaded into the conduit 7 and has radial guide vanes 33, slidably engaging the hole in the bushing to guide the valve in its movement toward or away from its seat. A spring 34, acting between one end of casing 1 and valve 31 tends to hold the latter closed.

The casing 1 has at its inlet end a threaded nipple 35 screwed into the outlet end of conduit 7. A lock nut 36 serves to lock the two members 1 and 3 together. Casing 1 has a conduit 37 therethrough interconnecting the conduit 7 with the outlet spout 4. This spout is threaded into the outlet end of conduit 37 and held in place by a lock nut 38 and the joint sealed by packing 39. The conduit 37 is partitioned by a wall 40 having an opening 41 therethrough surrounded on the inlet side by a valve seat 42. A disk valve 43 cooperates with this seat to control the flow through opening 41. This valve 43 is fixed to the lower end of a stem 44, extending upwardly through a bushing 45, and a suitable seal 45', into a cylinder 46, containing a suitable piston 47. The stem can rotate in the piston but is held against axial movement relatively thereto. The piston is urged upwardly by a spring 48, acting between the lower face of the piston and the lower end wall of cylinder 46, into which the bushing 45 is screwed. The upper end of cylinder 46 is closed by a cap 49 threaded onto the upper end of the peripheral wall of the cylinder. A vent 50 is provided in such wall. The valve is normally held open in the elevated position shown by means of spring 48.

The auxiliary valve 43 is closed automatically when liquid in the tank being serviced rises at the outlet end of spout 4. This is effected by the following means. A venturi 51 is provided in conduit 37 on the outlet side of valve 43. The throat of this venturi is connected by passages 52 and 53 with the lower end of cylinder 46. Liquid, discharging through the venturi, is operable at certain times to draw the air out of passages 52 and 53 and cylinder 46 and cause the piston 47 to be lowered to press valve 43 against its seat 42. Normally, a vent is provided to prevent this valve closing action. A tube 54 is suitably mounted inside spout 4 and its inner end is connected by passages 55 and 56 to passages 52 and 53 and thus to the venturi 51 and cylinder 46, respectively. The outer end of tube 54 (Fig. 3) is connected to a lower portion of the peripheral wall of spout 4, near the outlet end thereof, by a screw 57 and coupling 58. A hole 59 is provided through this screw to connect the interior of the tube 54 with the space surrounding the outlet end of spout 4. Normally, the suction effect of the venturi is not sufficient, when the described vent is open, to move the piston 47 and close the auxiliary valve 43. When, however, the liquid in the tank being filled rises far enough to close the hole 59 in screw 56, the suction created is sufficient to move piston 47 to close valve 43. Once closed, this valve 43 will be held closed by the pressure of liquid upon its upper face because the valve is imperforate. Thus, even through the nozzle spout 4 is withdrawn from the tank so that the vent is opened, the valve remains closed.

Usually, an auxiliary valve of this character has a small vent opening therethrough in order to release the liquid pressure, which presses the valve to its seat. Such a vent opening is not desired here. A complete and effective closure is desired to prevent escape of any liquid in case the hand lever 16 is held open in any way. Hence, the valve 43 is made imperforate and its opening is conditioned upon the closing of the main valve 9 by full release of the hand lever 16. The latter has a short arm 60, the outer end of which is adapted to engage a pin 61 slidably mounted in the lower wall of casing 1. This pin is slidable through a suitable seal 62, held in the body and compressed about the stem by a gland nut 63, threaded into the body. The valve 43 has a central depending stem 64 which is engageable by pin 61. The arrangement is such that when the hand lever 16 of the main valve is in fully closed position, the arm 60 will have lifted pin 61 and stem 64 far enough to just crack valve 43 from its seat, whereby the liquid pressure on this valve is relieved and spring 48 is enabled to lift it into fully open position.

Fixed to the valve stem 64 are a plurality of spiral vanes 65, the outer edges of which slidably fit the hole 41 in partition 40. Liquid forced through conduit 37 must pass through the space between these vanes in order to reach the outlet side of partition 40 and pass through the venturi 51 to the outlet spout 4. These vanes 65 form a turbine rotor, being rotated by the pressure of the liquid and turning the valve 43 and its stem 44. This turning movement is used to actuate a suitable signal, while the tank is being serviced. When the tank is filled sufficiently the piston 47 descends, closes valve 43 and thus cuts off the flow of liquid to the vanes of the turbine rotor. The cessation of the signal appraises the service man of the fact that the filling operation has been completed.

As one illustrative example, an audible signal such as a bell 66 has been provided. This bell is hung from its center by a loose rivet 67 from the center of the cross bar portion of a strap 68, having the shape of an inverted U. The ends of the strap are fixed to cap 49, one at each of two diametrically opposite points thereon. On the interior of the bell (Fig. 5) are a circular series of angularly spaced projections 69. A striker 70 is provided which comprises a flat plate with rounded ends and of a length substantially equal to the sum of the inner radius of the bell and the inner radius of one of the projections. This plate is mounted for radial sliding movement in the laterally-spaced upstanding parts of a carrier 71, which is centrally fixed to the upper end of an extension 72 of the valve stem 44. Hence, when this stem rotates, one end of the striker 70 will engage the side of one projection 69, be forced inwardly by said projection to carry its other end into the path of another projection 69 on the other side of the bell and so on, causing the bell to ring as many times per revolution of the rotor as there are projections 69 on the bell. The ringing of the bell continues until the delivery of liquid is stopped by the closing of valve 43, actuated as above described, by the rise of liquid in the tank being serviced.

The automatic shut-off may, if desired, be used without the signal-actuating means. The necessary changes are indicated in Fig. 6. The bell 66, its hanger 68, striker 70, carrier 71 and stem 72 are omitted and the upper end of cylinder 46 is closed by an imperforate screw cap 73. A nut 74 clamps the piston 47 to stem 44 and the spiral vanes 65 on valve stem 64 are replaced by three spider arms 75. The valve action is the same as heretofore described but the valve and its stem need not rotate.

Obviously, the auxiliary valve and bell ringer need not be provided as shown in a separate casing as an attachment to a standard hose nozzle but may otherwise be incorporated into the body of the hose nozzle itself. The form of the invention disclosed is desirable to enable the invention to be embodied in existing nozzles but it is not essential for all purposes.

The invention provides an automatic shut-off valve especially adapted for use with hose nozzles having a self closing valve which is manually opened by a lever which can be, although it ought not to be, wedged or latched open, whereby dispensing can occur without the service attendant being present. Assuming servicing of a tank to occur under such adverse conditions, the auxiliary valve of this invention will automatically and completely close to prevent overflow of liquid and will remain closed until the attendant releases the hand lever and allows the main valve to close. Thus, opening of the auxiliary valve is conditioned on closing the main valve to assure safe operation even under the adverse conditions described.

The invention also affords in connection with the automatic shut-off feature a signalling means for warning the attendant that the dispensing operation is completed.

What is claimed is:

1. A safety device for nozzles used to fill containers comprising, a casing having a liquid-conducting conduit therethrough with an inlet adapted for connection to a source of liquid under pressure and an outlet spout adapted for insertion in the container to be filled, a partition in said conduit having a cylindrical opening therethrough and an annular seat surrounding and coaxial with said opening, a valve disk coaxial with said seat and opening and mounted for movement in the direction of its axis toward and away from said seat, a turbine rotor carried by that face of said valve which lies adjacent said seat and mounted in said opening for sliding movement in the direction of said axis, a signaling means connected to said rotor to be actuated by rotation thereof, means for moving said valve away from said seat enabling liquid to flow from the inlet through the rotor and opening to the outlet, and means for moving said valve into engagement with said seat to stop the flow to said rotor and actuation of the signaling means.

2. A safety device for nozzles used to fill containers comprising, a casing having a liquid-conducting conduit therethrough with an inlet adapted for connection to a source of liquid under pressure and an outlet spout adapted for insertion in the container to be filled, a partition in said conduit having a cylindrical opening therethrough and an annular seat surrounding and coaxial with said opening, a valve disk coaxial with said seat and opening and mounted for movement in the direction of its axis toward and away from said seat, a turbine rotor carried by that face of said valve which lies adjacent said seat and mounted in said opening for sliding movement in the direction of said axis, a signaling means connected to said rotor to be actuated by rotation thereof, said casing having a cylinder coaxial with the valve and rotor, a piston in said cylinder, a piston rod connected at one end to the piston and at the other end to the other face of said valve, a spring for moving said piston to open said valve and yieldingly holding it in open position, a venturi in said conduit on the outlet side of said valve, a conduit from the throat of the venturi to said cylinder operable by the flow of liquid through the venturi to create a partial vacuum in the cylinder for moving the piston against said spring to close said valve, and a vent conduit from said throat to the outlet end of said spout and terminating with an open end adapted to communicate with the tank being filled, said vent conduit preventing creation of vacuum in said cylinder until said opening of the vent conduit is covered by liquid in said tank.

3. A safety device for nozzles used to fill containers, comprising, a casing having a liquid-conducting conduit therethrough with an inlet adapted for connection to a source of liquid under pressure and an outlet spout adapted for insertion in the container to be filled, a partition in said conduit having a cylindrical opening therethrough and an annular seat surrounding and coaxial with said opening on the inlet side of the partition, a valve disk coaxial with said seat and opening and mounted for movement in the direction of its axis toward and away from said seat, a turbine rotor carried by that face of said valve which lies adjacent said seat and mounted in said opening for sliding movement in the direction of said axis, a signaling means connected to said rotor to be actuated by rotation thereof, said casing having a cylinder coaxial with the valve and rotor, a piston in said cylinder, a piston rod connected at one end to the piston and at the other end to the other face of said valve, a spring for moving said piston to open said valve and yieldingly hold it in open position, a venturi in said conduit on the outlet side of said valve, a conduit from the throat of the venturi to said cylinder operable by the flow of liquid through the venturi to create a partial vacuum in the cylinder for moving the piston against said spring to close said valve, a vent conduit from said throat to the outlet end of said spout and terminating with an open end adapted to communicate with the tank being filled, said vent conduit preventing creation of vacuum in said cylinder until said opening of the vent conduit is covered by liquid in said tank, and manually operated means for cracking said valve from its seat to relieve the pressure of liquid thereon and enable said spring to move the valve to open position.

4. In a nozzle adapted for filling containers and having a liquid-conducting conduit therethrough with an inlet end adapted for connection to a source of liquid under pressure and an outlet spout for insertion in the container to be filled, a main valve in said conduit for controlling the flow therethrough, yieldable means holding said valve closed, a manually operable lever for opening said valve against said means, a partition in said conduit between the main valve and said spout, said partition having an opening therethrough and an annular seat on the inlet side of the partition surrounding said opening, an auxiliary valve movable toward and away from said seat and when engaged with said seat completely closing said opening, spring means acting on said auxiliary valve in a direction to move it away from its seat and exerting a force on the valve less than that of the pressure of the liquid holding the auxiliary valve to its seat, connecting means between said lever and auxiliary valve for cracking the latter from its seat when and only when the hand lever is positioned to close the main valve, whereby the pressure on the auxiliary valve is relieved and the spring means moves it to open position, and means for moving the auxiliary valve into engagement with its seat when the container is filled to the level of the discharge end of said spout.

ALFRED L. GRISÉ.

REFERENCES CITED

The following references are of record in the file of this patent:

UNITED STATES PATENTS

| Number | Name | Date |
|---|---|---|
| 1,343,365 | Hamilton | June 15, 1920 |
| 2,103,055 | Brinkley | Dec. 21, 1937 |
| 2,205,351 | Featherston | June 18, 1940 |
| 2,557,336 | Buchanan | June 19, 1951 |